United States Patent
Kustermans et al.

(10) Patent No.: US 10,914,383 B2
(45) Date of Patent: Feb. 9, 2021

(54) SEAL, ASSEMBLY, AND METHODS OF USING THE SAME

(71) Applicant: SAINT-GOBAIN PERFORMANCE PLASTICS CORPORATION, Solon, OH (US)

(72) Inventors: Jan Kustermans, Brecht (BE); Herman M. Dubois, Duffel (BE); Roel Maes, Scherpenheuvel-Zichem (BE); Gino L. Stevenheydens, Willebroek (BE); Kris Van Gils, Kontich (BE); Gabriele Tittonel, Lier (BE); Wim Vandenheuvel, Machelen (BE)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 128 days.

(21) Appl. No.: 15/972,670

(22) Filed: May 7, 2018

(65) Prior Publication Data
US 2018/0328492 A1 Nov. 15, 2018

Related U.S. Application Data

(60) Provisional application No. 62/503,611, filed on May 9, 2017.

(51) Int. Cl.
*F16J 15/3232* (2016.01)
*F16J 15/08* (2006.01)
(Continued)

(52) U.S. Cl.
CPC .......... *F16J 15/3232* (2013.01); *F16K 41/08* (2013.01); *F16K 41/086* (2013.01);
(Continued)

(58) Field of Classification Search
CPC .......... F16K 41/02; F16K 41/04; F16K 41/08; F16K 5/0694; F16J 15/025; F16J 15/3236; F16J 15/3232
See application file for complete search history.

(56) References Cited

U.S. PATENT DOCUMENTS 3,620,136 A * 11/1971 Weatherhogg ........ B60T 13/563
                                                    92/151
3,834,663 A *  9/1974 Donnelly ............... F16K 1/2285
                                                    251/173
(Continued)

FOREIGN PATENT DOCUMENTS

BE      1016445 A3    11/2006
CN      2856655 Y      1/2007
(Continued)

OTHER PUBLICATIONS

International Search Report & Written Opinion for PCT/US2018/031346, dated Nov. 13, 2018, 15 pages.

*Primary Examiner* — Nicholas L Foster
(74) *Attorney, Agent, or Firm* — Abel Schillinger, LLP; Chi Suk Kim (57) ABSTRACT

A seal including a metal annular body having an inner diameter and an outer diameter, the annular body including a main body portion including a first lip extending axially from the main body portion, the first lip adapted to provide a radial seal; and a second lip extending radially from the main body portion toward the outer diameter, the second lip adapted to provide an axial seal.

19 Claims, 3 Drawing Sheets

(51) Int. Cl.
*F16J 15/3236* (2016.01)
*F16K 41/08* (2006.01)

(52) U.S. Cl.
CPC ........ *F16J 15/0881* (2013.01); *F16J 15/0887* (2013.01); *F16J 15/3236* (2013.01); *F16J 2015/0856* (2013.01)

(56) References Cited

U.S. PATENT DOCUMENTS

| | | | | |
|---|---|---|---|---|
| 4,208,035 | A * | 6/1980 | Alvarez | F16K 3/0236 251/196 |
| 4,341,233 | A * | 7/1982 | Broadway | F16K 1/2263 137/72 |
| 4,418,889 | A * | 12/1983 | Krause | F16K 1/2263 137/72 |
| 4,541,449 | A * | 9/1985 | Burke | F16K 3/316 137/72 |
| 4,586,720 | A * | 5/1986 | Simmons | F16C 13/02 277/565 |
| 5,375,812 | A | 12/1994 | Kent | |
| 5,419,532 | A * | 5/1995 | Fan | F16K 5/0673 251/315.08 |
| 5,467,966 | A * | 11/1995 | Nicholson | F16K 3/0227 251/174 |
| 5,556,139 | A * | 9/1996 | Wilkins | F16J 15/3236 285/108 |
| 5,722,637 | A | 3/1998 | Faramarzi et al. | |
| 5,979,499 | A | 11/1999 | Smith | |
| 5,997,003 | A | 12/1999 | Turner | |
| 6,612,030 | B2 | 9/2003 | Halling | |
| 6,966,537 | B2 | 11/2005 | Sundararajan | |
| 7,093,820 | B2 * | 8/2006 | Anderson | F16J 15/3244 251/214 |
| 7,325,783 | B2 * | 2/2008 | Hunter | F16K 25/00 251/195 |
| 7,431,307 | B2 * | 10/2008 | Anderson | F16J 15/3244 277/647 |
| 7,789,397 | B2 | 9/2010 | Halling | |
| 7,963,503 | B2 * | 6/2011 | Day | F16J 15/061 251/305 |
| 8,360,391 | B2 | 1/2013 | Morris | |
| 8,403,296 | B2 | 3/2013 | Phillips | |
| 8,579,256 | B2 * | 11/2013 | Wetzel | F16K 5/0647 251/315.13 |
| 9,394,996 | B2 * | 7/2016 | Short | F23R 3/283 |
| 2005/0230652 | A1 * | 10/2005 | Anderson | F16J 15/3244 251/214 |
| 2007/0045582 | A1 * | 3/2007 | Anderson | F16J 15/3244 251/214 |
| 2008/0073612 | A1 * | 3/2008 | Day | F16J 15/061 251/306 |
| 2008/0224422 | A1 | 9/2008 | Halling | |
| 2009/0001307 | A1 | 1/2009 | Pozzati | |
| 2011/0012044 | A1 * | 1/2011 | Wetzel | F16K 5/0647 251/315.1 |
| 2011/0272892 | A1 * | 11/2011 | Grace | F16J 15/166 277/395 |
| 2012/0193561 | A1 | 8/2012 | Maes et al. | |
| 2013/0168104 | A1 | 7/2013 | Sinnott et al. | |
| 2016/0245406 | A1 | 8/2016 | Ryther et al. | |
| 2017/0009616 | A1 | 1/2017 | Shishido et al. | |
| 2017/0175899 | A1 * | 6/2017 | Lee | F16J 15/3236 |
| 2019/0145520 | A1 * | 5/2019 | Kung | F16J 15/3252 277/562 |

FOREIGN PATENT DOCUMENTS

| | | |
|---|---|---|
| CN | 202418878 U | 9/2012 |
| CN | 205244587 U | 5/2016 |
| EP | 1925865 A1 | 5/2008 |
| GB | 2340917 A | 7/1999 |
| JP | 2015148331 A | 8/2015 |
| WO | 2014106231 A1 | 7/2014 |

* cited by examiner

SEAL, ASSEMBLY, AND METHODS OF USING THE SAME

CROSS-REFERENCE TO RELATED APPLICATION(S)

This application claims priority under 35 U.S.C. § 119(e) to U.S. Patent Application No. 62/503,611 entitled "SEAL, ASSEMBLY, AND METHODS OF USING THE SAME," by Jan Kustermans et al., filed May 9, 2017, which is assigned to the current assignee hereof and incorporated herein by reference in its entirety.

FIELD OF THE DISCLOSURE

The present disclosure relates to seal and seal assemblies, and more particularly to seals with sealing lips.

RELATED ART

Commonly, a valve is used to inhibit or facilitate flow of a fluid through an assembly having a housing or chamber. In some cases, valves may use seals or seal assemblies to prevent leakage, contain pressure, contain a desired substance within the housing, or exclude contamination from the housing. In some particular cases, valves may be used in harsh operating conditions such as subsea valves with extreme or harsh temperatures and pressures. In such cases, valves require higher reliability to tolerate these conditions without suffering excessive friction or wear.

There continues to exist a need for seal assemblies having improved sealing properties and higher reliabilities in harsh operating conditions.

BRIEF DESCRIPTION OF THE DRAWINGS

Embodiments are illustrated by way of example and are not limited in the accompanying figures.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive- or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the seal and/or valve arts.

Figure 1:
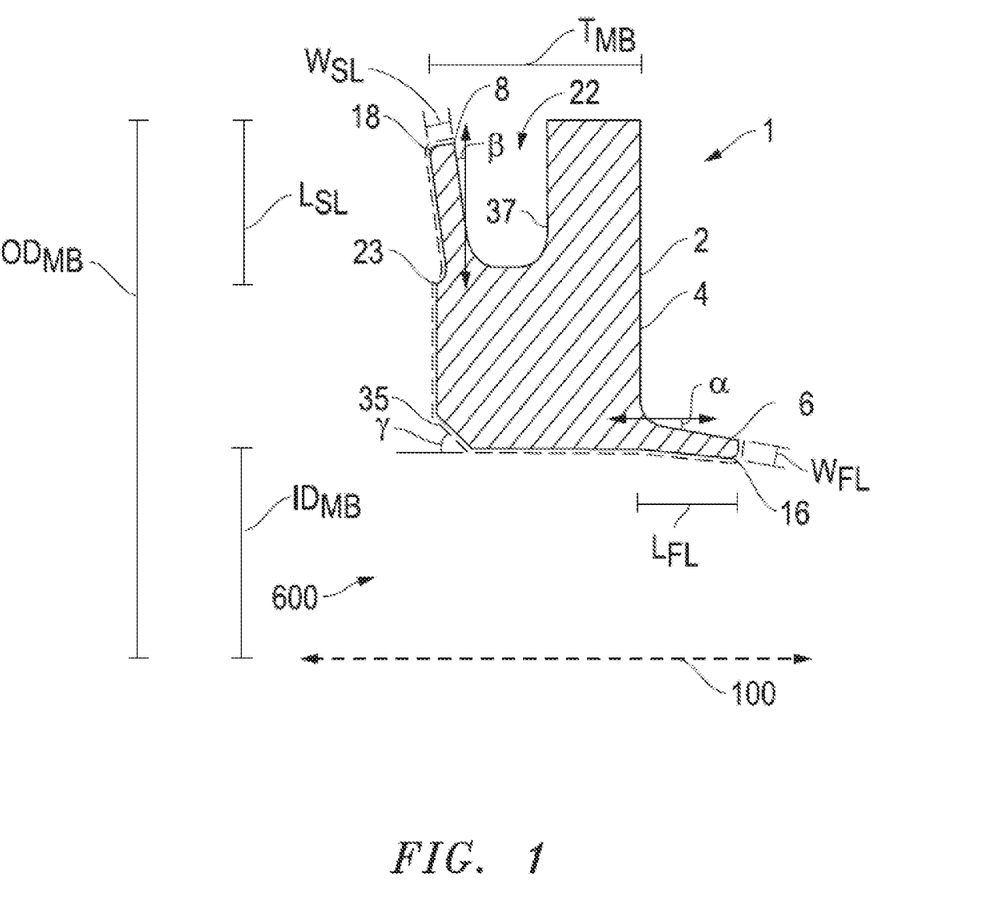
FIG. 1 includes a cross section plan view of a seal in accordance with an embodiment.
Figure 2:
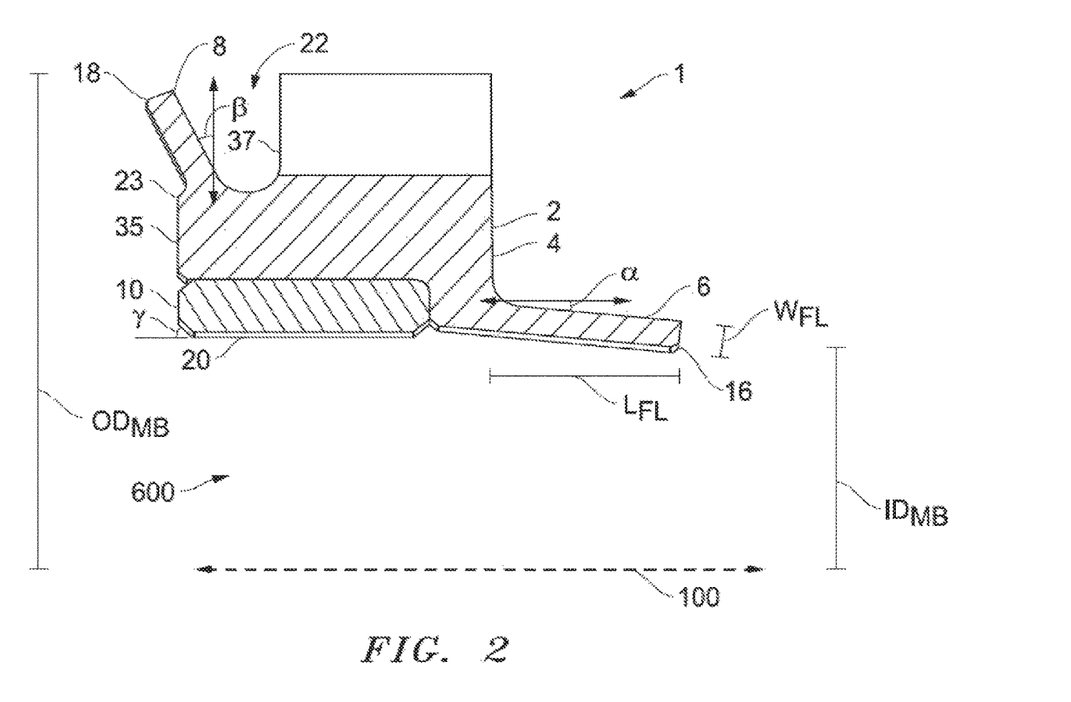
FIG. 2 includes a cross section plan view of a seal in accordance with an embodiment.

Referring initially to FIGS. 1-2, a seal 1 is shown according to a number of embodiments. The seal 1 can generally include an annular body 2 disposed about a central axis 100. In a number of embodiments, the annular body 2 can be generally cylindrical and can further include an aperture 600. In a particular aspect, the aperture 600 can be coaxial, or substantially coaxial, with the central axis 100. The annular body 2 may define an exterior surface 35 of the seal 1. The annular body 2 may further include a main body portion 4. The main body portion 4 may include an inner diameter $ID_{MB}$ and an outer diameter $OD_{MB}$. The seal also may include a nominal axial thickness $T_{MB}$. The annular body 2 may further include a first lip 6. The first lip 6 may extend axially from the main body portion 4. In a number of embodiments, the first lip 6 may extend radially beyond the inner diameter $ID_S$ of the main body portion 4. The first lip 6 may be adapted to provide a radial seal by providing a radial or axial force.

In a number of embodiments, the annular body portion may further include a second lip 8. The second lip 8 may extend radially from the main body portion 4. In an embodiment, the main body portion 4 and the second lip 8 may form a recess 22. The recess 22 can be coaxial to the central axis 100. The recess 22 may be located axially adjacent the second lip 8. The recess 22 may be contained within the space formed between an axial inner edge 37 of the main body portion 4 and the second lip 8. The recess 22 can define a generally rectilinear cross section when viewed in a direction perpendicular to a plane extending radially from the central axis 100. Moreover, the annular cavity can comprise one or more fillets, rounded edges, angular components, or any combination thereof. In a number of embodiments, as shown in FIGS. 1-2, the second lip 8 may have a rounded shoulder 23 with the main body portion 4. The second lip 8 may be adapted to provide an axial seal by providing a radial or axial force. In a number of embodiments, the second lip 8 may extend axially beyond the nominal axial thickness $T_{MB}$ of the main body portion 4. In a number of embodiments, the first lip 6 may seal independently of the second lip 8 and vice versa. In a number of embodiments, the first lip 6 may seal dependent on the second lip 8. In a number of embodiments, the second lip 8 may seal dependent on the first lip 6.

In a number of embodiments, as shown in FIG. 2, the seal 1 can further include an inner radial piece 10. The inner radial piece 10 may extend toward and be exposed along the inner diameter $ID_S$ of the seal 1. In such a manner, the inner radial piece 10 can apply a radial or axial force against at least a portion of the main body portion 4.

Figure 3:
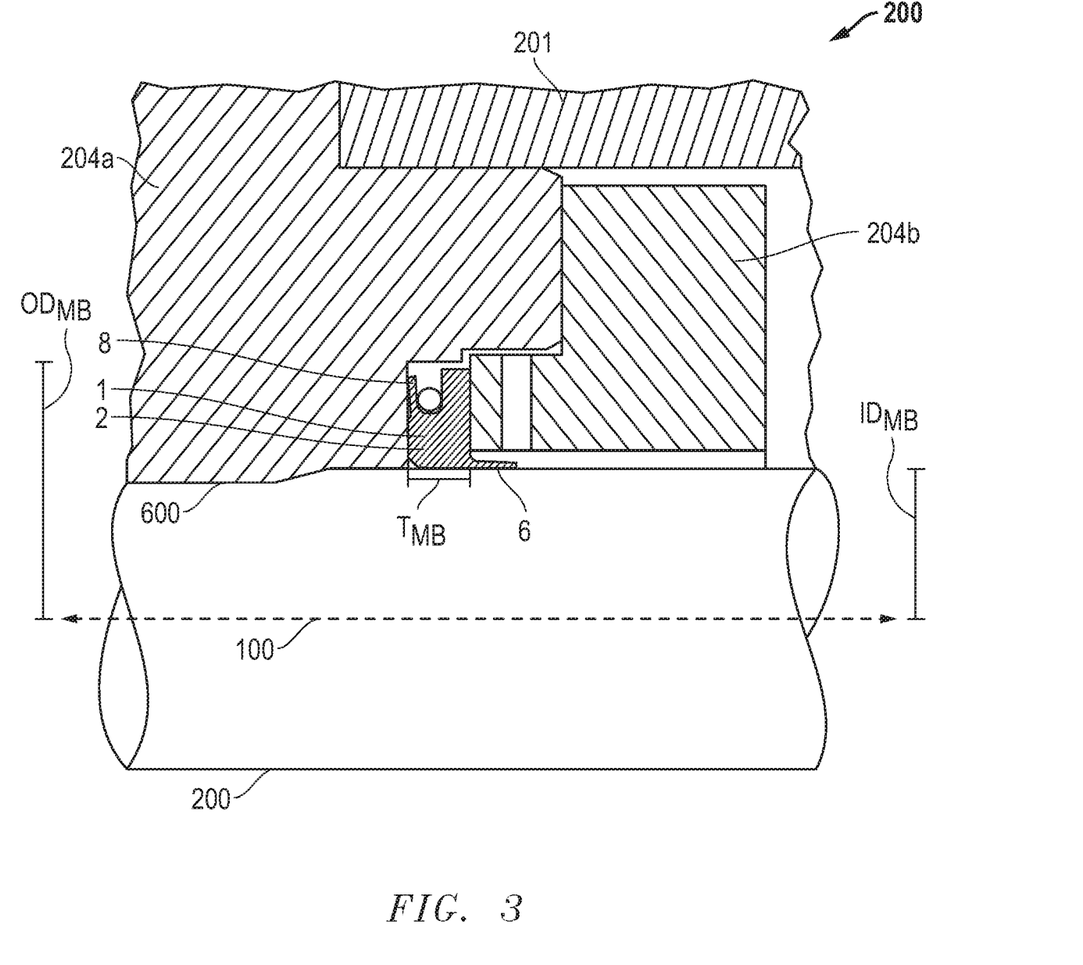
FIG. 3 includes a cross section plan view of an assembly including a seal in accordance with an embodiment.

Referring to FIG. 3, in a number of embodiments, the seal 1 may be used or be a component in an assembly 200 disposed about a central axis 100. In an embodiment, the assembly 200 may be a valve assembly. In more specific embodiments, the valve assembly 200 may be a ball valve assembly. In a number of more specific embodiments, the seal assembly 200 may be a subsea valve or subsea valve assembly. In a number of embodiments, the assembly 200 may include a housing 201. The assembly 200 may include at least one rod or stem 202. The assembly 200 or housing 201 may include at least one bonnet 204. The bonnet 204 can generally include an annular body disposed about a central axis 100. In a number of embodiments, the assembly 200 or housing 201 may include a first bonnet 204a and a second bonnet 204b. The stem 202 may extend axially through at least one of the first bonnet 204a or the second bonnet 204b. The exterior surface 35 of the annular body 2 may contact at least one of the components of the assembly 200 (including, but not limited to, the housing 201, bonnet 204a, 204b, or stem 202) to provide a radial or axial force against at least one component of the assembly 200. As shown in FIG. 3, the first lip 6 may be adapted to contact and provide a radial seal with at least one of the stem 202 or the bonnet 204. The first lip 6 may be adapted to contact and provide a radial seal with at least one of the stem 202, the first bonnet 204a or the second bonnet 204b.

Further as shown in FIG. 3, the second lip 8 may be adapted to contact and provide an axial seal with a bonnet 204. In a number of embodiments, the second lip 8 may be adapted to contact and provide an axial seal with the first bonnet 204a. In a number of embodiments, the second lip 8 may be adapted to contact and provide an axial seal with the second bonnet 204b. In a number of embodiments, the seal 1 may be adapted to contact and provide a seal with the at least one bonnet 204a, 204b, and contact and provide a seal with the stem 202 to provide a seal in both an axial and radial direction relative to the seal 1. In a number of embodiments, the seal 1 may provide a seal with the at least one bonnet 204a, 204b, through the deflection of at least one of the first lip 6 or the second lip 8. In a number of embodiments, the seal 1 may provide a seal with the stem 202, through the deflection of at least one of the first lip 6 or the second lip 8. In a number of embodiments, both the first lip 6 and second lip 8 may deflect to provide a seal in both an axial and radial direction relative to the seal 1. The exterior surface 35 of the annular body 2 can be biased in the radial or axial direction by at least one of the first lip 6 or second lip 8, thereby increasing a radial or axial force exerted by the exterior surface 35 of the annular body 2 against at least one of the components of the assembly 200 (including, but not limited to, the housing 201, bonnet 204a, 204b, or stem 202). In a number of embodiments, the assembly 200 can include a secondary seal 1', which may have similar subcomponents (including, but not limited to, the annular body 2, the main body portion 4, the first lip 6, the second lip 8, or inner radial piece 10). In a number of embodiments, the valve assembly could include additional parts (not shown) including, but not limited to, a ball member, a first passageway to the valve, a second passageway from the valve, or may be another element.

In a number of embodiments, the inner diameter $ID_{MB}$ of the main body portion 4 of the seal 1 may be at least 1 mm, 5 mm, at least 10 mm, at least 25 mm, at least 50 mm, at least 75 mm, at least 100 mm, at least 150 mm, at least 250 mm, at least 500 mm. The inner diameter $ID_{MB}$ of the main body portion 4 of the seal 1 may be no greater than 5000 mm, no greater than 4000 mm, no greater than 3000 mm, no greater than 2000 mm, no greater than 1500 mm, no greater than 1000 mm.

In a number of embodiments, the outer diameter $OD_{MB}$ of the main body portion 4 of the seal 1 may be at least 1 mm, 5 mm, at least 10 mm, at least 25 mm, at least 50 mm, at least 75 mm, at least 100 mm, at least 150 mm, at least 250 mm, at least 500 mm. The outer diameter $OD_{MB}$ of the main body portion 4 of the seal 1 may be no greater than 5000 mm, no greater than 4000 mm, no greater than 3000 mm, no greater than 2000 mm, no greater than 1500 mm, no greater than 1000 mm.

In a number of embodiments, the nominal axial thickness $T_{MB}$ of the main body portion 4 of the seal 1 may be at least 1 mm, 5 mm, at least 10 mm, at least 25 mm, at least 50 mm, at least 75 mm, at least 100 mm, at least 150 mm, at least 250 mm, at least 500 mm. The nominal axial thickness $T_{MB}$ of the main body portion 4 of the seal 1 may be no greater than 5000 mm, no greater than 4000 mm, no greater than 3000 mm, no greater than 2000 mm, no greater than 1500 mm, no greater than 1000 mm.

In an embodiment, the first lip 6 may extend radially beyond the inner diameter $ID_{MB}$ of the main body portion 4 to form an angle α with a line parallel to the central axis 100. The angle α may be at least 3°, such as at least 5°, such as at least 7°, such as at least 9°, such as at least 13°, such as at least 15°, such as at least 20°, such as at least 25°, such as at least 30. The angle α may be no greater than 45°, such as no greater than 42°, such as no greater than 37°, such as no greater than 35°, such as no greater than 33°, such as no greater than 30°, such as no greater than 27°. The first lip 6 may have a axial force needed to deflect the lip 6 of between about 15 to about 150 N/mm, such as between about 20 to about 140 N/mm, such as between about 25 to about 130 N/mm, or such as between about 30 to about 130 N/mm. In a number of embodiments, the outer axial tip 16 of the first lip 6 may be radiused.

In an embodiment, the first lip 6 may have a length $L_{FL}$ of at least 1 mm, 5 mm, at least 10 mm, at least 25 mm, at least 50 mm, at least 75 mm, at least 100 mm, at least 150 mm, at least 250 mm, at least 500 mm. The first lip 6 may have a length $L_{FL}$ that may be no greater than 5000 mm, no greater than 4000 mm, no greater than 3000 mm, no greater than 2000 mm, no greater than 1500 mm, no greater than 1000 mm. In an embodiment, the first lip 6 may have a width $W_{FL}$ of at least 1 mm, 5 mm, at least 10 mm, at least 25 mm, at least 50 mm, at least 75 mm, at least 100 mm, at least 150 mm, at least 250 mm, at least 500 mm. The first lip 6 may have a width $W_{FL}$ that may be no greater than 5000 mm, no greater than 4000 mm, no greater than 3000 mm, no greater than 2000 mm, no greater than 1500 mm, no greater than 1000 mm. In a number of embodiments, the width $W_{FL}$ of the first lip 6 may vary along its length $L_{FL}$.

In a number of embodiments, the first lip 6 can define a first lip aspect ratio as measured by a length $L_{FL}$ thereof as compared to a width $W_{FL}$ thereof. In an embodiment, at least one first lip 6 can have a first lip aspect ratio of at least 1.1:1, such as at least 1.5:1, at least 2:1, at least 3:1, at least 4:1, at least 5:1, or even at least 10:1. In an embodiment, the first lip aspect ratio can be no greater than 100:1, such as no greater than 50:1, or even no greater than 25:1.

In an embodiment, the second lip 8 may extend axially beyond the nominal axial thickness $T_{MB}$ of the main body portion 4 to form an angle β with a line parallel to the central axis 100. The angle β may be at least 3°, such as at least 5°, such as at least 7°, such as at least 9°, such as at least 13°, such as at least 15°, such as at least 20°, such as at least 25°, such as at least 30. The angle β may be no greater than 45°, such as no greater than 42°, such as no greater than 37°, such as no greater than 35°, such as no greater than 33°, such as no greater than 30°, such as no greater than 27°. The second lip 8 may have an axial force needed to deflect the lip 8 of between about 15 to about 150 N/mm, such as between about 20 to about 140 N/mm, such as between about 25 to about 130 N/mm, or such as between about 30 to about 130 N/mm. In a number of embodiments, the outer radial tip 18 of the second lip 8 may be radiused.

In an embodiment, the second lip 8 may have a length $L_{SL}$ of at least 1 mm, 5 mm, at least 10 mm, at least 25 mm, at least 50 mm, at least 75 mm, at least 100 mm, at least 150 mm, at least 250 mm, at least 500 mm. The second lip 8 may have a length $L_{SL}$ that may be no greater than 5000 mm, no greater than 4000 mm, no greater than 3000 mm, no greater than 2000 mm, no greater than 1500 mm, no greater than 1000 mm. In an embodiment, the second lip 8 may have a width $W_{SL}$ of at least 1 mm, 5 mm, at least 10 mm, at least 25 mm, at least 50 mm, at least 75 mm, at least 100 mm, at least 150 mm, at least 250 mm, at least 500 mm. The second lip 8 may have a width $W_{SL}$ that may be no greater than 5000 mm, no greater than 4000 mm, no greater than 3000 mm, no greater than 2000 mm, no greater than 1500 mm, no greater than 1000 mm. In a number of embodiments, the width $W_{SL}$ of the second lip 8 may vary along its length $L_{SL}$.

Each second lip 8 can define a second lip aspect ratio as measured by a length $L_{SL}$ thereof as compared to a width $W_{SL}$ thereof. In an embodiment, at least one second lip 8 can have a second lip aspect ratio of at least 1.1:1, such as at least 1.5:1, at least 2:1, at least 3:1, at least 4:1, at least 5:1, or even at least 10:1. In an embodiment, the second lip aspect ratio can be no greater than 100:1, such as no greater than 50:1, or even no greater than 25:1.

In a number of embodiments, the first lip 6 length $L_{FL}$ may be longer than the second lip 8 length $L_{SL}$. In a number of embodiments, the first lip 6 width $W_{FL}$ may be wider than the second lip 8 width $W_{SL}$. In a number of embodiments, the second lip 8 length $L_{SL}$ may be longer than the first lip 6 length $L_{FL}$. In a number of embodiments, the second lip 8 width $W_{SL}$ may be wider than the first lip 6 width $W_{FL}$. In a number of embodiments, the first lip 6 length $L_{FL}$ may be the same as the second lip 8 length $L_{SL}$. In a number of embodiments, the first lip 6 width $W_{FL}$ may be the same as the second lip 8 width $W_{SL}$.

In a number of embodiments, the first lip 6 and second lip 8 can define a two lip length aspect ratio as measured by a length $L_{FL}$ of the first lip 6 thereof as compared to the length $L_{SL}$ of the second lip 8 thereof. In an embodiment, the seal 1 can have a two lip length aspect ratio of at least 1.1:1, such as at least 1.5:1, at least 2:1, at least 3:1, at least 4:1, at least 5:1, or even at least 10:1. In an embodiment, the two lip length aspect ratio can be no greater than 100:1, such as no greater than 50:1, or even no greater than 25:1. The first lip 6 and second lip 8 can define a two lip width aspect ratio as measured by a width $W_{FL}$ of the first lip 6 thereof as compared to the width $W_{SL}$ of the second lip 8 thereof. In an embodiment, the seal 1 can have a two lip width aspect ratio of at least 1.1:1, such as at least 1.5:1, at least 2:1, at least 3:1, at least 4:1, at least 5:1, or even at least 10:1. In an embodiment, the two lip width aspect ratio can be no greater than 100:1, such as no greater than 50:1, or even no greater than 25:1. In a number of embodiments, an undeformed state, angles α and β can be the same or different. In this regard, the seal 1 does not require a symmetrical cross section when viewed in a direction perpendicular to a plane extending radially from the central axis 100. For example, in particular embodiments, the seal 1 can have a segmented, or polygonal, cross-sectional profile.

Still referring to FIGS. 1-2, in a number of embodiments, at least one of the first lip 6 or the second lip 8 may be integral with the main body portion 4 to form a seal 1. In a number of embodiments, the main body portion 4, first lip 6, and second lip 8 may all be integral to form a seal 1. In a number of embodiments, the main body portion 4, first lip 6, and second lip 8, and inner radial piece 10 may all be integral to form a seal 1. In a number of embodiments, the inner radial piece 10 may be made of a material dissimilar to at least one of the main body portion 4, first lip 6, or second lip 8.

Referring back to FIGS. 1-3, in a number of embodiments, the first lip 6 may be adapted to deflect elastically and plastically in the radial direction as assembled and be positioned into contact with at least one of the stem 202 or bonnet 204. In a number of embodiments, the first lip 6 may be adapted to deflect elastically and plastically in the radial direction as assembled and be positioned into contact with at least one of the stem 202, first bonnet 204a, or the second bonnet 204b. In a number of embodiments, the second lip 8 may be adapted to deflect elastically and plastically in the axial direction as assembled and be positioned into contact with the bonnet 204. In a number of embodiments, the second lip 8 may be adapted to deflect elastically and plastically in the axial direction as assembled and be positioned into contact with at least one of the first bonnet 204a or the second bonnet 204b. In a number of embodiments, the inner radial piece 10 may allow for radial or axial deflection of at least one of the first lip 6 or second lip 8 to be reduced by 5-10%.

In a number of embodiments, as shown in FIGS. 1-2, at least one of the main body portion 4 or inner radial piece 10 may have an edge that forms an angle γ with a line parallel to the central axis 100. The angle γ may be at least 3°, such as at least 5°, such as at least 7°, such as at least 9°, such as at least 13°, such as at least 15°, such as at least 20°, such as at least 25°, such as at least 30. The angle γ may be no greater than 45°, such as no greater than 42°, such as no greater than 37°, such as no greater than 35°, such as no greater than 33°, such as no greater than 30°, such as no greater than 27°.

Figure 4:
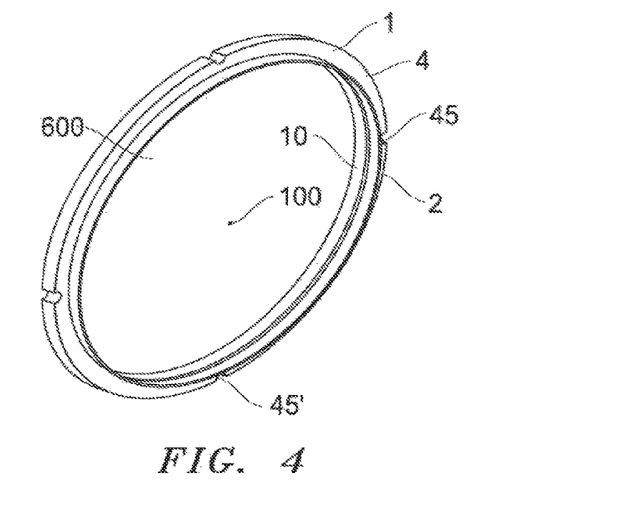
FIG. 4 includes a perspective view of a seal in accordance with an embodiment.

Referring now to FIG. 4, in a number of embodiments, the seal 1 may include a plurality of notches 45. The notches 45 may be configured to engage a component within the assembly 200 to prevent rotation of the seal 1 when the seal is installed in the assembly 200. The notches 45 may provide for mechanical attachment to another component within the assembly 200 through mechanical attachment, mechanical deformation (e.g., crimping or splines), adhesive, welding, melting, fastening, or any other way.

In a number of embodiments, the seal 1 (or any of its subcomponents including, but not limited to, the annular body 2, the main body portion 4, the first lip 6, the second lip 8, or inner radial piece 10) can include any material commonly used in the seal arts. The seal 1 (or any of its subcomponents including, but not limited to, the annular body 2, the main body portion 4, the first lip 6, the second lip 8, or inner radial piece 10) can comprise any suitable material with sufficient rigidity to withstand axial and longitudinal forces. In a particular embodiment, the seal 1 (or any of its subcomponents including, but not limited to, the annular body 2, the main body portion 4, the first lip 6, the second lip 8, or inner radial piece 10) can include a polymer, such as, for example, ultra-high molecular weight polyurethane (UHMWPE), poly(vinyl chloride) (PVC), a polyketone, a polyaryletherketone (PEAK) such as polyether ether ketone (PEEK), a polyaramid, a polyimide, a polytherimide, a polyphenylene sulfide, a polyethersulfone, a polysulfone, a polypheylene sulfone, a polyamideimide, ultra high molecular weight polyethylene, a fluoropolymer, a polyamide, a polybenzimidazole, or any combination thereof. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), aliphatic polyamides, or even para-aramids such as Kevlar®, or any combination thereof. The polymer may be injection-molded. In another embodiment, the seal 1 (or any of its subcomponents including, but not limited to, the annular body 2, the main body portion 4, the first lip 6, the second lip 8, or inner radial piece 10) can comprise a metal or alloy (such as, but not limited to, aluminum, chromium, nickel, zinc, copper, magnesium, tin, platinum, titanium, tungsten, lead, iron, bronze, steel, spring steel, stainless steel) formed through a machining process. In a number of embodiments, the metal may be lubricious. In yet another embodiment, the seal 1 (or any of its subcomponents including, but not limited to, the annular body 2, the main body portion 4, the first lip 6, the second lip 8, or inner radial piece 10) can comprise a ceramic or any other suitable material. The seal 1 (or any of its subcomponents including, but not limited to, the annular body 2, the main body portion 4, the first lip 6, the second lip 8, or inner radial piece 10) can comprise a homogenous composition or may comprise two or more discrete portions having different compositions. The seal 1 (or any of its subcomponents including, but not limited to, the annular body 2, the main body portion 4, the first lip 6, the second lip 8, or inner radial piece 10) can be formed from a single piece, two pieces, or several pieces joined together by melting, sintering, welding, adhesive, fasteners, threading, or any other suitable fastening means. Moreover, in one non-limiting embodiment, although not applicable to all embodiments, the seal 1 may not include a polymer, and more particularly, may be essentially free of any/all polymers. In a particular aspect, the seal 1 may comprise a single material free of any coating or surface layer. In a certain aspect, at least one of the first lip 6 or second lip 8 can be formed from a monolithic construction. In another aspect, at least one of the first lip 6 or second lip 8 can be formed from multiple components joined together by any means recognizable in the art, such as, for example, by mechanical deformation (e.g., crimping or splines), adhesive, welding, melting, or any combination thereof.

In a particular aspect, the seal 1 (or any of its subcomponents including, but not limited to, the annular body 2, the main body portion 4, the first lip 6, the second lip 8, or inner radial piece 10) can further include one or more fillers, such as graphite, glass, aromatic polyester (EKONOL®), bronze, zinc, boron nitride, carbon, and/or polyimide. Concentrations of each of these fillers in a polymer such as PTFE may be greater than 1%, such as greater than 5%, greater than 10% or even greater than 20% by weight.

In addition, the seal 1 (or any of its subcomponents including, but not limited to, the annular body 2, the main body portion 4, the first lip 6, the second lip 8, or inner radial piece 10) can further include lubrication to enhance sliding characteristics against the shaft. Exemplary lubricants can include molybdenum disulfide, tungsten disulfide, graphite, grapheme, expanded graphite, boron nitrade, talc, calcium fluoride, or any combination thereof. Additionally, the lubricant can comprise alumina, silica, titanium dioxide, calcium fluoride, boron nitride, mica, Wollastonite, silicon carbide, silicon nitride, zirconia, carbon black, pigments, or any combination thereof.

In a number of embodiments, the seal 1 (or any of its subcomponents including, but not limited to, the annular body 2, the main body portion 4, the first lip 6, the second lip 8, or inner radial piece 10) can include a metal. The seal 1 (or any of its subcomponents including, but not limited to, the annular body 2, the main body portion 4, the first lip 6, the second lip 8, or inner radial piece 10) can include a metal or alloy (such as, but not limited to, aluminum, zinc, copper, magnesium, tin, platinum, titanium, tungsten, lead, iron, bronze, steel, spring steel, stainless steel) In a number of embodiments, the seal 1 (or any of its subcomponents including, but not limited to, the annular body 2, the main body portion 4, the first lip 6, the second lip 8, or inner radial piece 10) can include a metal including a nickel, iron, or chromium alloy. In an embodiment, the seal 1 (or any of its subcomponents including, but not limited to, the annular body 2, the main body portion 4, the first lip 6, the second lip 8, or inner radial piece 10) may be manufactured by a method conventional in the art such as, but not limited to, metalworking, forming, forging, extrusion, molding, printing, or may be another type. The seal 1 can be formed of a composite material including two or more metals formed. In an embodiment, the inner radial piece 10 may include a lubricious metal or polymer as described above which is different than the material of the main body portion 4. In an embodiment, the seal 1 (or any of its subcomponents including, but not limited to, the annular body 2, the main body portion 4, the first lip 6, the second lip 8, or inner radial piece 10) can consist entirely of metallic materials including, but not limited to, the ones listed.

In a number of embodiments, the seal 1 (or any of its subcomponents including, but not limited to, the annular body 2, the main body portion 4, the first lip 6, the second lip 8, or inner radial piece 10) can be untreated or treated to enhance the physical or chemical properties thereof. For example, in particular embodiments, the seal 1 can be treated using techniques such as laser melting or ablation, mechanical sandblasting or chemical picking. In further embodiments, the seal 1 can be treated by galvanizing, chromate or phosphate treatments, or anodizing. In a number of embodiments, the surface 35 of the seal 1 may include a surface finish that cannot be achieved by machining. In a number of embodiments, the surface 35 of the seal 1 may be polished. In a number of embodiments, the seal 1 may have a surface finish provided by electrolytic polishing.

In a number of embodiments, the surface 35 finish of the seal 1 (or any of its subcomponents including, but not limited to, the annular body 2, the main body portion 4, the first lip 6, the second lip 8, or inner radial piece 10) may provide a surface roughness average Ra not greater than 0.1 μm, such as not greater than 0.05 μm, such as not greater than 0.01 μm, such as not greater than 0.005 μm, or such as not greater than 0.001 μm. In a number of embodiments, the surface 35 finish of the seal 1 (or any of its subcomponents including, but not limited to, the annular body 2, the main body portion 4, the first lip 6, the second lip 8, or inner radial piece 10) may provide surface maximum height of the profile Rt of not greater than 0.6 μm, such as not greater than 0.5 μm, such as not greater than 0.1 μm, such as not greater than 0.05 μm, or such as not greater than 0.01 μm.

In a particular aspect, the annular body 2 can have a generally C-shaped cross section when viewed in a direction perpendicular to a plane extending radially from the central axis 100. In another aspect, the annular body 2 can have any other shape when viewed in a direction perpendicular to a plane extending radially from the central axis 100, such as, for example, a generally I-shape, a generally J-shape, or even a generally L-shape.

In a particular aspect, the seal 1 (or any of its subcomponents including, but not limited to, the annular body 2, the main body portion 4, the first lip 6, the second lip 8, or inner radial piece 10) can comprise a material having a Brinell hardness (HB) in a range between and including about 70 to about 150, such as in a range between about 75 to about 145, in a range between about 80 to about 140, in a range between about 85 to about 135, in a range between about 90 to about 130, in a range between about 95 to about 125, in a range between about 100 to about 120, or even in a range between about 105 to about 115.

In another particular aspect, the seal 1 (or any of its subcomponents including, but not limited to, the annular body 2, the main body portion 4, the first lip 6, the second lip 8, or inner radial piece 10) can comprise a material having an ultimate tensile strength or material strength of at least about 350 megapascal (MPa), such as at least about 360 MPa, at least about 370 MPa, at least about 380 MPa, at least about 390 MPa, at least about 400 MPa, or even at least about 410 MPa. In further embodiments, the annular body 2 can comprise a material having an ultimate tensile strength of no greater than about 5000 MPa, such as no greater than about 4000 MPa, no greater than about 2000 MPa, no greater than about 1000 MPa, or even no greater than about 500 MPa. Moreover, the seal 1 can comprise a material having a tensile strength within a range between and including any of the values described above, such as, for example, between about 500 MPa and about 1800 MPa.

In another aspect, the seal 1 (or any of its subcomponents including, but not limited to, the annular body 2, the main body portion 4, the first lip 6, the second lip 8, or inner radial piece 10) can comprise a material having a Modulus of Elasticity (MOE) of between about 50 GPa and about 1000 MPa, such as between about 65 GPa and about 750 GPa, between about 75 GPa and about 500 GPa, between about 80 GPa and about 250 GPa, between about 85 GPa and about 200 GPa, between about 95 GPa and about 150 GPa, or even between about 100 GPa and about 130 GPa. In a more particular embodiment, the seal 1 can comprise a material having an MOE of between about 100 GPa and about 300 GPa.

In another aspect, the seal 1 (or any of its subcomponents including, but not limited to, the annular body 2, the main body portion 4, the first lip 6, the second lip 8, or inner radial piece 10) can comprise a material having a Poisson's ratio of between about 0.5 to about 0.1, such as between about 0.45 to about 0.15, such as between about 0.4 to about 0.2, such as between about 0.35 to about 0.25. In a more particular embodiment, the seal 1 can comprise a material having a Poisson's ratio of between about 0.2 and 0.4.

In a further aspect, the seal 1 (or any of its subcomponents including, but not limited to, the annular body 2, the main body portion 4, the first lip 6, the second lip 8, or inner radial piece 10) can comprise a material having a coefficient of thermal expansion (CTE) of between about $1 \times 10^{-6}$ in/in° F. and about $75 \times 10^{-6}$ in/in° F., such as between about $2 \times 10^{-6}$ in/in° F. and about $50 \times 10^{-6}$ in/in° F., between about $3 \times 10^{-6}$ in/in° F. and about $25 \times 10^{-6}$ in/in° F., between about $5 \times 10^{-6}$ in/in° F. and about $15 \times 10^{-6}$ in/in° F., or even between about $7 \times 10^{-6}$ in/in° F. and about $11 \times 10^{-6}$ in/in° F.

In yet a further aspect, the seal 1 (or any of its subcomponents including, but not limited to, the annular body 2, the main body portion 4, the first lip 6, the second lip 8, or inner radial piece 10) can comprise a material having an elongation at break (EAB) of no greater than about 60%, such as no greater than about 55%, no greater than about 50%, no greater than about 45%, no greater than about 40%, no greater than about 30%, no greater than about 20%, or even no greater than about 10%. In further embodiments, the annular body 2 can comprise a material having an EAB of no less than about 0.5%, such as no less than about 1%, no less than about 2%, or even no less than about 5%. Moreover, the seal 1 can comprise a material having an EAB within a range between and including any of the values described above, such as, for example, between about 45% and about 55%.

In a number of embodiments, the seal 1 (or any of its subcomponents including, but not limited to, the annular body 2, the main body portion 4, the first lip 6, the second lip 8, or inner radial piece 10) can comprise a coating 20 on its surface 35. In a number of embodiments, the coating 20 may include a material having a low temperature hard coating, such as, for example, a diamond-like coating (DLC) impregnated therein. In particular embodiments, the DLC can have a lattice structure similar to a diamond, wherein each carbon atom comprises four carbon atoms equally spaced. Alternatively, the seal 1 (or any of its subcomponents including, but not limited to, the annular body 2, the main body portion 4, the first lip 6, the second lip 8, or inner radial piece 10) can comprise a material impregnated therein by use of a high velocity oxygen fuel (HVOF) coating. HVOF coatings can extend sealing surface life by significantly increasing the sealing element's resistance to wear and corrosion. Moreover, HVOF coatings can affect a smoother surface finish with bond strengths in excess of approximately 10,000 pounds per square inch.

In an aspect, the seal 1 can be adapted to operate within a wide temperature range while simultaneously maintaining effective sealing rates. For example, the seal 1 can be adapted to operate at temperatures within a range between about −275° C. and about 300° C., such as within a range between about −250° C. and about 250° C., within a range between about −100° C. and about 100° C., or even within a range between about −40° C. and about 20° C., while exhibiting a leakage rate of less than about 10 mL/min/mm, such as less than about 9 mL/min/mm, less than about 8 mL/min/mm, less than about 7 mL/min/mm, less than about 6 mL/min/mm, less than about 5 mL/min/mm, less than about 4 mL/min/mm, less than about 3 mL/min/mm, less than about 2 mL/min/mm, less than about 0 mL/min/mm, less than about 0.75 mL/min/mm, less than about 0.5 mL/min/mm, less than about 0.25 mL/min/mm, less than about 0.1 mL/min/mm, or even less than about 0.01 mL/min/mm. Moreover, the seal 1 can be adapted to operate within the above described temperature range while having a leakage rate of about 0 mL/min/mm.

In a number of embodiments, the components of the assembly 200 (including, but not limited to, the housing 201, bonnet 204a, 204b, or stem 202) can include any material commonly used in the seal arts. The components of the assembly 200 can comprise any suitable material with sufficient rigidity to withstand axial and longitudinal forces. In a particular embodiment, the components of the assembly 200 (including, but not limited to, the housing 201, bonnet 204a, 204b, or stem 202) can include a polymer, such as, for example, ultra-high molecular weight polyurethane (UHMWPE), poly(vinyl chloride) (PVC), a polyketone, a polyaryletherketone (PEAK) such as polyether ether ketone (PEEK), a polyaramid, a polyimide, a polytherimide, a polyphenylene sulfide, a polyethersulfone, a polysulfone, a polypheylene sulfone, a polyamideimide, ultra high molecular weight polyethylene, a fluoropolymer, a polyamide, a polybenzimidazole, or any combination thereof. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), aliphatic polyamides, or even para-aramids such as Kevlar®, or any combination thereof. The polymer may be injection-molded. In another embodiment, the components of the assembly 200 can comprise a metal or alloy (such as, but not limited to, aluminum, chromium, nickel, zinc, copper, magnesium, tin, platinum, titanium, tungsten, lead, iron, bronze, steel, spring steel, stainless steel) formed through a machining process. In yet another embodiment, the components of the assembly 200 can comprise a ceramic or any other suitable material. The components of the assembly 200 can be formed from a single piece, two pieces, or several pieces joined together by welding, adhesive, fasteners, threading, or any other suitable fastening means.

In a particular aspect, the components of the assembly 200 (including, but not limited to, the housing 201, bonnet 204a, 204b, or stem 202) can further include one or more fillers, such as graphite, glass, aromatic polyester (EKONOL®), bronze, zinc, boron nitride, carbon, and/or polyimide. Concentrations of each of these fillers in a polymer such as PTFE may be greater than 1%, such as greater than 5%, greater than 10% or even greater than 20% by weight.

In addition, the components of the assembly 200 (including, but not limited to, the housing 201, bonnet 204a, 204b, or stem 202) can further include lubrication to enhance sliding characteristics against the shaft. Exemplary lubricants can include molybdenum disulfide, tungsten disulfide, graphite, grapheme, expanded graphite, boron nitrade, talc, calcium fluoride, or any combination thereof. Additionally, the lubricant can comprise alumina, silica, titanium dioxide, calcium fluoride, boron nitride, mica, Wollastonite, silicon carbide, silicon nitride, zirconia, carbon black, pigments, or any combination thereof.

The components of the assembly 200 (including, but not limited to, the housing 201, bonnet 204a, 204b, or stem 202) can comprise a homogenous composition or may comprise two or more discrete portions having different compositions. The components of the assembly 200 (including, but not limited to, the housing 201, bonnet 204a, 204b, or stem 202) can be formed from a single piece, two pieces, or several pieces joined together by melting, sintering, welding, adhesive, fasteners, threading, or any other suitable fastening means. Moreover, in one non-limiting embodiment, although not applicable to all embodiments, the components of the assembly 200 (including, but not limited to, the housing 201, bonnet 204a, 204b, or stem 202) may not include a polymer, and more particularly, may be essentially free of any/all polymers. In a particular aspect, the components of the assembly 200 (including, but not limited to, the housing 201, bonnet 204a, 204b, or stem 202) may comprise a single material free of any coating or surface layer.

According to still another aspect, there may be provided a method including providing a valve 200 having an axis 100, first and second bonnets 204a, 204b, and a stem 202 extending axially through the first and second bonnets 204a, 204b. The method may further include providing a seal 1 including a metal annular body 2 having an inner diameter $ID_S$ and an outer diameter $OD_S$. The annular body 2 may include a main body portion 4 having a first lip 6 extending axially from the main body portion 4, the first lip 6 adapted to provide a radial seal. The annular body may further include a second lip 8 extending from the main body portion 4 toward the outer diameter outer diameter $OD_S$, the second lip 8 adapted to provide an axial seal. The method may further include positioning the seal 1 in contact with the stem 202 and at least one of the bonnets 204a, 204b to seal at least one of the bonnet 204a, 204b and the stem 202 in both an axial and radial direction relative to the seal 1.

The seal 1, assembly 200 or method described above may provide higher reliability and quality of sealing in more severe operating conditions (such as 20 ksi pressure, 200° C. temperature). They may provide at least one of high elasticity, high strength, high strain at break, maximum sealing capacity, minimum friction, or minimum plastic deformation under these operating conditions. Further, the sealing of the seal 1 through the first lip 6 and/or the second lip 8 may be decoupled, making it easier to handle tolerances within the assembly 200 without significantly influencing sealing strength. The coating 20 may provide maximum wear resistance and minimum friction.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1: A seal comprising: a metal annular body having an inner diameter and an outer diameter, the annular body comprising: a main body portion comprising: a first lip extending axially from the main body portion, the first lip adapted to provide a radial seal; and a second lip extending radially from the main body portion toward the outer diameter, the second lip adapted to provide an axial seal.

Embodiment 2: A assembly comprising: a valve having an axis, first and second bonnets, and a stem extending axially through the first and second bonnets; and a seal comprising: a metal annular body having an inner diameter and an outer diameter, the annular body comprising: a main body portion comprising: a first lip extending axially from the main body portion, the first lip adapted to provide a radial seal; and a second lip extending radially from the main body portion toward the outer diameter, the second lip adapted to provide an axial seal.

Embodiment 3: A method comprising: providing a valve having an axis, first and second bonnets, and a stem extending axially through the first and second bonnets; providing a seal comprising: a metal annular body having an inner diameter and an outer diameter, the annular body comprising: a main body portion comprising: a first lip extending axially from the main body portion, the first lip adapted to provide a radial seal; and a second lip extending radially from the main body portion toward the outer diameter, the second lip adapted to provide an axial seal; and positioning the seal in contact with stem and at least one of the bonnets to seal at least one of the bonnet and the stem in both an axial and radial direction relative to the seal.

Embodiment 4: The assembly, or method of any of embodiments 1-3, wherein at least one of the first lip or the second lip is integral with the main body portion.

Embodiment 5: The seal, assembly, or method of embodiment 4, wherein at least one of the first lip or the second lip is metal.

Embodiment 6: The seal, assembly, or method of embodiment 5, wherein the metal comprises a nickel, iron, or chromium alloy.

Embodiment 7: The seal, assembly, or method of any of embodiments 1-6, wherein the metal of the annular body comprises a nickel, iron, or chromium alloy.

Embodiment 8: The seal, assembly, or method of any of embodiments 1-7, wherein the first lip or second lip comprises an axial force in a range of about 300 N/mm of deflection to about 10 N/mm of deflection.

Embodiment 9: The seal, assembly, or method of any of embodiments 1-8, wherein the first lip extends radially beyond the inner diameter of the main body portion.

Embodiment 10: The seal, assembly, or method of any of embodiments 1-9, wherein the main body portion has a nominal axial thickness and the second lip extends radially beyond the nominal axial thickness of the main body portion.

Embodiment 11: The seal, assembly, or method of any of embodiments 2-10, wherein the first lip is adapted to be deflected elastically and plastically in the radial direction as assembled and in contact with the stem.

Embodiment 12: The seal, assembly, or method of any of embodiments 2-11, wherein the second lip is adapted to be elastically and plastically in the axial direction as assembled and in contact with at least one of the first bonnet or the second bonnet.

Embodiment 13: The seal, assembly, or method of any of embodiments 1-12, wherein the seal further comprises an inner radial piece made of a material dissimilar from the annular body, the inner radial piece extending to and being exposed along the inner diameter of the seal.

Embodiment 14: The seal, assembly, or method of embodiment 13, wherein the inner radial piece comprises a lubricious metal or polymer.

Embodiment 15: The seal, assembly, or method of any of embodiments 1-14, wherein the main body further comprises a recess axially adjacent the second lip.

Embodiment 16: The seal, assembly, or method of any of embodiments 1-15, wherein an outer axial tip of the first lip is radiused.

Embodiment 17: The seal, assembly, or method of any of embodiments 1-16, wherein an outer radial tip of the second lip is radiused.

Embodiment 18: The seal, assembly, or method of any of embodiments 1-17, wherein the seal comprises a coating.

Embodiment 19: The seal, assembly, or method of embodiment 18, wherein the coating comprises at least one of carbon nitride, tungsten carbide, or diamond like carbon.

Embodiment 20: The seal, assembly, or method of any of embodiments 1-19, wherein the recess comprises a plurality of notches located on the outer diameter of the annular body of the seal.

Embodiment 21: The seal, assembly, or method of any of embodiments 1-20, wherein the first lip is thicker than the second lip.

Embodiment 22: The seal, assembly, or method of any of embodiments 1-21, wherein the first lip is longer than the second lip.

Embodiment 23: The seal, assembly, or method of any of embodiments 1-22, wherein the seal comprises a surface finish provided by electrolytic polishing.

Embodiment 24: The seal, assembly, or method of any of embodiments 1-23, wherein the seal comprises a surface roughness average Ra not greater than 0.2 µm.

Embodiment 25: The seal, assembly, or method of any of embodiments 1-24, wherein the seal comprises a surface maximum height of the profile Rt of not greater than 0.6 µm.

Embodiment 26: The seal, assembly, or method of any of embodiments 1-25, wherein the seal has a material strength in a range of at least about 500 MPa to about 1800 MPa.

Embodiment 27: The seal, assembly, or method of any of embodiments 1-26, wherein the seal has an elastic modulus in a range of 100 GPa to about 300 GPa.

Embodiment 28: The seal, assembly, or method of any of embodiments 1-27, wherein the seal has a Poisson ratio in a range of about 0.2 to about 0.4.

Embodiment 29: The seal, assembly, or method of any of embodiments 1-28, the seal consists entirely of metallic materials.

Embodiment 30: The seal, assembly, or method of any of embodiments 20-29, wherein the notches are configured to engage a component in a valve to prevent rotation of the seal when the seal is installed in the valve.

Embodiment 31: The seal, assembly, or method of any of embodiments 13-30, wherein the inner radial piece is adapted to allow radial deflection of at least one of the first lip or the second lip to be reduced by 5-10%.

Embodiment 32: The seal, assembly, or method of any of embodiments 13-31, wherein the inner radial piece comprises a polymer.

Embodiment 33: The seal, assembly, or method of any of embodiments 13-32, wherein the inner radial piece comprises a metal.

Embodiment 34: The seal, assembly, or method of any of embodiments 1-33, wherein the first lip seals independently of the second lip.

Embodiment 35: The seal, assembly, or method of any of embodiments 1-34, wherein the first lip sealing is dependent on the sealing of the second lip.

Embodiment 36: The assembly of embodiment 2, wherein the assembly comprises a subsea ball valve.

Embodiment 37: The assembly of embodiment 36, wherein the seal is a primary seal, and the valve comprises at least one secondary seal.

This written description uses examples, including the best mode, and also to enable those of ordinary skill in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. For example, embodiments may relate to rotational devices such as an electric motor, such as a windshield wiper motor), or axial sliding applications, such as a steering column adjustment mechanism.

While embodiments have been shown or described in only some of forms, it should be apparent to those skilled in the art that they are not so limited, but are susceptible to various changes without departing from the scope of the invention.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A seal comprising:
   a metal annular body having an inner diameter and an outer diameter, the annular body comprising:
   a main body portion;
   a first lip extending axially from the main body portion, the first lip adapted to provide a radial seal; and
   a second lip extending radially from the main body portion toward the outer diameter, the second lip adapted to provide an axial seal,
   wherein the first lip is adapted to be deflected elastically and plastically in the radial direction, wherein the second lip has a shoulder with the main body portion, wherein the entirety of the first lip or the second lip has a substantially rectangular profile when taken in cross section along a central axis, wherein the first lip comprises a primarily axially oriented lip, and wherein the second lip comprises a primarily radially oriented lip that is radially overlapping with the main body portion such that it does not extending radially beyond an outermost diameter of the main body portion.

2. The seal of claim 1, wherein at least one of the first lip or the second lip is integral with the main body portion.

3. The seal of claim 2, wherein at least one of the first lip or the second lip is metal.

4. The seal of claim 3, wherein the metal comprises a nickel, iron, or chromium alloy.

5. The seal of claim 1, wherein the metal of the annular body comprises a nickel, iron, or chromium alloy.

6. The seal of claim 1, wherein the first lip extends radially beyond the inner diameter of the main body portion.

7. The seal of claim 1, wherein the main body portion has a nominal axial thickness and the second lip extends radially beyond the nominal axial thickness of the main body portion.

8. The seal of claim 1, wherein the seal further comprises an inner radial piece made of a material dissimilar from the annular body, the inner radial piece extending to and being exposed along the inner diameter of the metal annular body.

9. The seal of claim 8, wherein the inner radial piece comprises a lubricious metal or a polymer.

10. The seal of claim 1, wherein the main body further comprises a recess axially adjacent the second lip.

11. The seal of claim 1, wherein an outer axial tip of the first lip is radiused.

12. The seal of claim 1, wherein an outer radial tip of the second lip is radiused.

13. The seal of claim 1, wherein the seal comprises a coating.

14. The seal of claim 13, wherein the coating comprises at least one of carbon nitride, tungsten carbide, or diamond like carbon.

15. The seal of claim 1, wherein the first lip is capable of sealing independently of the second lip.

16. An assembly comprising:
   a valve having an axis, first and second bonnets, and a stem extending axially through the first and second bonnets; and
   a seal comprising: a metal annular body having an inner diameter and an outer diameter, the annular body comprising: a main body portion; a first lip extending axially from the main body portion, the first lip adapted to provide a radial seal; and a second lip extending radially from the main body portion toward the outer diameter, the second lip adapted to provide an axial seal, wherein the first lip is adapted to be deflected elastically and plastically in the radial direction, wherein the second lip has a shoulder with the main body portion, wherein the entirety of the first lip or the second lip has a substantially rectangular profile when taken in cross section along a central axis, wherein the first lip comprises a primarily axially oriented lip, and wherein the second lip comprises a primarily radially oriented lip that is radially overlapping with the main body portion such that it does not extending radially beyond an outermost diameter of the main body portion.

17. The assembly of claim 16, wherein deflecting the first lip or second lip requires an axial force in a range of about 300 N/mm of deflection to about 10 N/mm of deflection.

18. The assembly of claim 16, wherein the second lip is adapted to be elastically and plastically deformable in the axial direction.

19. A method comprising:
   providing a valve having an axis, first and second bonnets, and a stem extending axially through the first and second bonnets;
   providing a seal comprising: a metal annular body having an inner diameter and an outer diameter, the annular body comprising: a main body portion; a first lip extending axially from the main body portion, the first lip adapted to provide a radial seal; and a second lip extending radially from the main body portion toward the outer diameter, the second lip adapted to provide an axial seal; and
   positioning the seal in contact with stem and at least one of the bonnets to seal at least one of the bonnet and the stem in both an axial and radial direction relative to the seal, wherein the first lip is adapted to be deflected elastically and plastically in the radial direction, wherein the second lip has a shoulder with the main body portion, wherein the entirety of the first lip or the second lip has a substantially rectangular profile when taken in cross section along a central axis, wherein the first lip comprises a primarily axially oriented lip, and wherein the second lip comprises a primarily radially oriented lip that is radially overlapping with the main body portion such that it does not extending radially beyond an outermost diameter of the main body portion.

* * * * *